Nov. 23, 1971     W. E. BURT     3,621,584

MAGNETOMETER COMPASS

Filed Dec. 10, 1969     5 Sheets-Sheet 1

WAYNE E. BURT
INVENTOR.

Nov. 23, 1971   W. E. BURT   3,621,584
MAGNETOMETER COMPASS
Filed Dec. 10, 1969   5 Sheets-Sheet 2

WAYNE E. BURT
INVENTOR.

BY *William T. Skeer*
Agent

*Don D. Doty*
Attorney

WAYNE E. BURT
INVENTOR.

Nov. 23, 1971  W. E. BURT  3,621,584
MAGNETOMETER COMPASS

Filed Dec. 10, 1969  5 Sheets-Sheet 4

WAYNE E. BURT
INVENTOR.

BY *William T. Skeer*
Agent

*Dox D. Doster*
Attorney

WAYNE E. BURT
INVENTOR.

United States Patent Office 3,621,584
Patented Nov. 23, 1971

3,621,584
MAGNETOMETER COMPASS
Wayne E. Burt, P.O. Box 4072,
Panama City, Fla. 32401
Filed Dec. 10, 1969, Ser. No. 883,719
Int. Cl. G01c *17/02, 17/38*
U.S. Cl. 33—224                                    10 Claims

ABSTRACT OF THE DISCLOSURE

This invention describes a magnetic compass suitable for use in a small craft. The compass employs a single magnetometer for sensing the earth's magnetic field and associated circuitry for computing the magnetic heading. The associated circuitry includes a pitch sensitive signal generator which together with analog circuits compensates for pitching motions of the vessel in which it is operated. Manually set signal sources provide signals for compensation of the horizontal and vertical components of the earth's magnetic field over the area in which the device is operated. An adjustable mounting for the magnetometer sensor places the device in a remote location and provides for adjustment which effectively compensates the compass for errors caused by vehicle roll.

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATIONS

This invention is particularly suited for obtaining a magnetic heading with respect to the earth's magnetic field and may be regarded as a unique variation of the device shown and described in the copending application of Wayne E. Burt entitled "Computer Stabilized Magnetic Compass," Ser. No. 799,000, filed Feb. 13, 1969.

BACKGROUND OF THE INVENTION

This invention relates to the field of instrumentation and more particularly to the field of magnetic navigation instruments. In greater particularity, but not by way of limitation, the invention relates to a magnetometer compass suitable for use in small vehicles. The invention will be described as it pertains to surface water craft but it should be realized that the invention is applicable to underwater, land, and air vehicles as well.

Despite the development in recent years of a vast array of electronic navigation systems and direction and ranging aids, many of the vessels plying the world's waterways still rely on magnetic bearings for navigation. There are a variety of reasons for the existence of this situation including high cost, mechanical and electrical complexity, lack of readily available electronic service, not to mention reluctance of older or experienced personnel to abandon a known system. It is likely that reliance on magnetic navigation headings will exist for years to come. In many instances where the vessel is operated over only a small geographic area, such as pilot boats and crew transport boats for offshore drilling operations, a magnetic compass is all that is required or desired for a navigation instrument.

Prior art magnetic compasses have been developed and refined over the years to become generally acceptable instruments for many purposes. However, there are many areas where improvement is still warranted. One such area is small motor propelled watercraft which are capable of changing direction of travel at a greater rate than can be tracked by the gimbal mounted fluid damped magnetic compass. Further, such instruments are sensitive to small spurious magnetic objects in the immediate presence thereof such as might be carried aboard on the person of passengers or crew members. Too, such instruments do not lend themselves to remote indicators.

It is known that the prior art includes magnetometer compasses which have instantaneous response characteristics and magnetic sensors that are remotely located, so as to preclude disturbance by anomalies within the vessel; however, these compasses are elaborate and expensive, which makes their use by small craft financially prohibitive.

SUMMARY OF THE INVENTION

The present invention overcomes the aforesaid disadvantages of prior art arrangements by providing a single magnetometer instrument with error compensation and circuitry advances heretofore found only in more costly and complex prior art units. As will be more completely explained in the accompanying description taken together with the appended claims, these results are obtained with a novel combination of gravity actuated pitch sensors, manually set circuits, and logic circuitry.

It is, therefore, an object of this invention to provide an improved magneto-responsive navigation instrument.

Another object of this invention is to provide a new means and method of determining a magnetic heading relative to the earth's magnetic field.

Another object of this invention is to provide a magnetic compass employing a single magnetometer.

Still another object of this invention is to provide a remote reading magnetic compass suitable for use in applications where low cost is an important factor.

A further object of this invention is the provision of a magnetic compass system which is insensitive to the pitch of the vehicle in which it is mounted.

Another object of this invention is the provision of a method and means of indicating the relative heading of a craft in relation to the magnetic north pole of the earth.

Another object of the instant invention is the provision of an indication method and apparatus for the detection from a small surface vessel of the presence of a magnetic anomaly, such as, for example, a swimmer wearing magnetic diving apparatus, sunken objects of a magnetic nature, other surface vessels, submarines, and other magnetic objects of interest.

A further object of this invention is to provide an improved remote reading magnetic compass system employing logic circuitry.

Yet another object of this invention is the provision of an improved remote reading magnetometer compass system incorporating sensed pitch correction and manually set vertical and horizontal magnet field component compensation.

A still further object of this invention is to provide a remote reading magnetometer compass system for small surface craft with a mechanical adjustability to enable the magnetometer mounting to be remotely moved to position the magnetometer sensor on the roll axis of the surface craft to compensate for different roll axis locations as determined by various vessel loadings.

It is a further object of this invention to provide a magnetometer compass with a minimum number of components, so as to provide for modular circuit replacement as a service convenience.

DESCRIPTION OF THE PREFERRED EMBODIMENT

Figure 1:
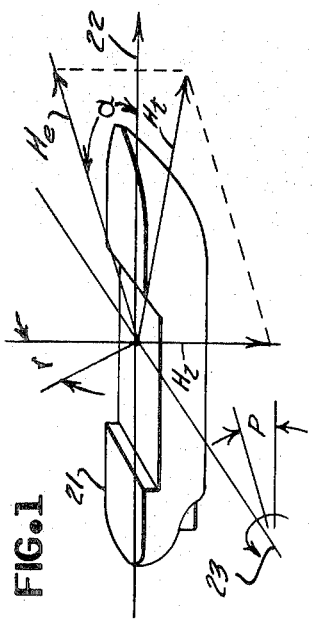
FIG. 1 is a schematic illustration of the magnetic field at a given point on the surface of the earth and the movements of a surface vessel in relation to the field at that point.

Referring to FIG. 1, there is shown schematically a ship 21 which is proceeding along a course indicated by a vector 22. Ship 21 is subject to angular movement, termed "pitch," about a transverse axis 23. This movent is schematically indicated as angle $p$ in FIG. 1. Ship 21 also experiences an angular movement, termed roll, about the heading vector 22. This roll movement is schematically indicated by the angle $r$ in FIG. 1. Although in ship handling roll and pitch angles refer to the total angular movement that the ship might experience, in this discussion the angles $r$ and $p$ are taken with respect to the vertical and horizontal references respectively.

As will be readily appreciated, ship 21 may be any type of vehicle for which terrestrial navigational information is required. Such vehicles include aircraft, ground vehicles, surface marine vessels, and subsurface vehicles. It should also be noted that the system will operate in extraterrestrial environments with magnetic datum fields. For purposes of explanation, this disclosure will be limited to the case where ship 21 is a surface watercraft. Those persons versed in the electronic navigation arts and having the benefit of the teaching contained herein will be able to make the appropriate modifications to adapt the invention to the appropriate vehicle if other uses are desired.

Likewise, for purposes of explanation secondary ship motions, such as yaw, swell and tide rise, and forward velocity of the ship will not be considered. In the small harbor type of craft for which the invention is primarily concerned such secondary movements are of very small importance and may be ignored.

At the position of ship 21 the earth's magnetic field is represented by a vector $H_t$. The angle that the field makes to the horizontal varies with the position on the earth. That is, in the region of the magnetic poles the field is nearly perpendicular while in the region of the magnetic equator there is virtually no angle of inclination. The angle that the field, represented by vector $H_t$, makes with the horizontal is readily obtainable from navigation charts and tables.

Because the magnetic field intercepts the earth at an angle to the horizontal, the field may be considered as having a vertical component, represented by the vector $H_z$, and a horizontal component, represented by the vector $H_e$. Since the strength of the earth's magnetic field in a given region is relatively constant, the values of the $H_e$ and $H_z$ are dependent upon the angle that $H_t$ makes with the horizontal. The horizontal component, $H_e$, is the force long associated with the earth's magnetism, hence its subscript notation, and is the mangetic datum with which magnetic headings are compared. In the schematic showing of FIG. 1, it will be noted that the angle of the ship's heading vector 22 with vector $H_e$ is shown as angle $\alpha$. This angle $\alpha$, the magnetic heading, is the parameter which is desired to be measured.

If a magnetometer which produces an output proportional to the magnetic flux intensity along a given axis is placed in a fixed orientation in ship 21 such that the axis is coincident with the longitudinal axis of the ship, the heading $\alpha$ may be determined. It will be observed with reference to FIG. 1 that along the heading vector the field measured is given by the expression $$H_L = H_e \cos \alpha$$

where:

$H_L$ is the horizontal component of the earth's magnetic field in the direction of the ship's heading;

$H_e$ is the horizontal component of the earth's magnetic field; and $\alpha$ is the angular heading of the ship relative to the direction of the earth's magnetic field.

For vehicle applications which are constrained to movement in the horizontal plane, the foregoing expression is valid. Unfortunately, as previously noted, ship 21 is subject to both pitch and roll movements. By locating the axis of sensitivity of the magnetometer on one of the axes of the pitch or roll movement, the magnetic effects of one of these movements may be minimized. It has proven more effective to locate the axis of sensitivity on the axis of roll. This axis is generally parallel to the longitudinal axis of the vessel.

In such a configuration the magnetic field measured along the direction of travel is given by the formula:

$$H_L = (H_e \cos \alpha \cos p) - (H_z \sin p)$$

where:

$H_L$ is the schematic field strength measured along the longitudinal axis of the ship, $H_e$ is the magnetic field strength of the earth in the horizontal direction, $\alpha$ is the heading angle of the ship with respect to magnetic north, $p$ is the angle of pitch of the ship with respect to the horizontal, and $H_z$ is the magnetic field strength of the earth in the verti- direction.

This expression, which may be easily derived from the geometric considerations, agrees quite well with empirical determinations from actual use. As previously mentioned, second order factors need not be taken into consideration for quite accurate navigation. From the aforegoing expression one can see that the cosine of the heading $\alpha$ is givin by $$\cos \alpha = \frac{H_L + H_z \sin p}{H_e \cos p}$$

Figure 2:
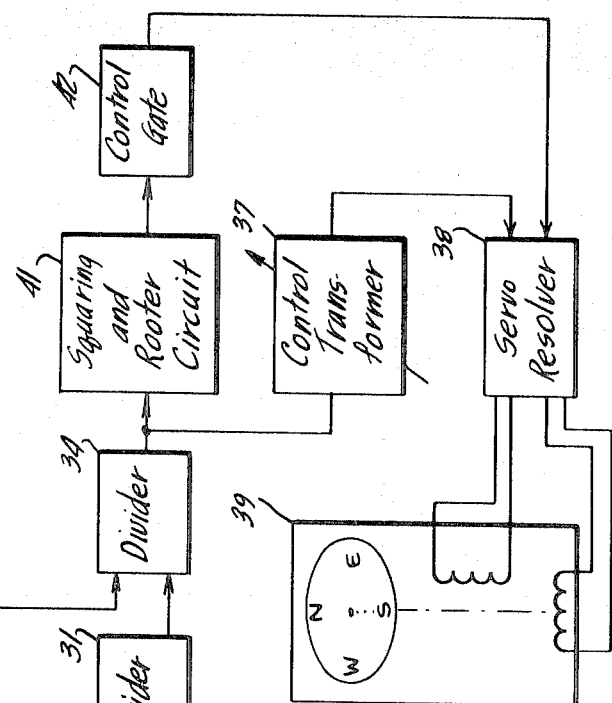
FIG. 2 is a block diagram showing an improved compass system according to the invention.
Figure 2:
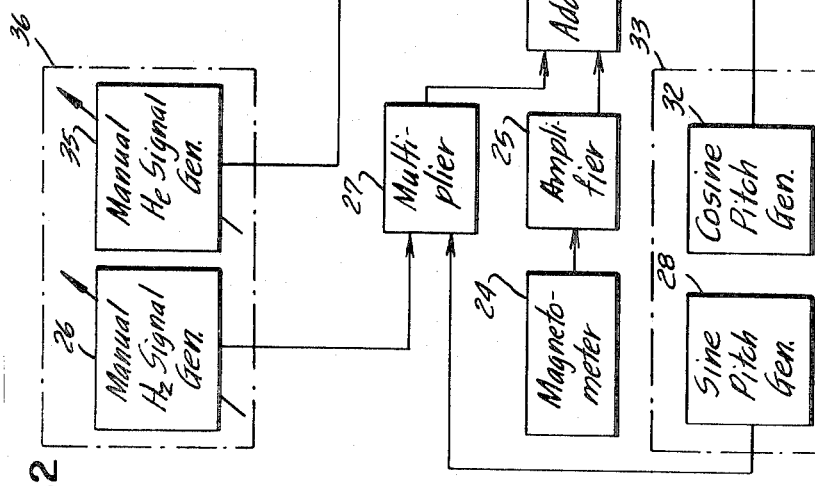

Referring to FIG. 2 there is shown a block diagram of the system according to the invention. A magnetometer 24 which is responsive to the magnetic flux along a predetermined axis has its electrical output increased to a suitable working level by amplifier 25, and together they comprise a magnetic sensor. Of course, if desired, other state-of-the-art electromagnetic detection devices, such as gradiometers, may be employed in place of magnetometer 24.

A manual signal generator 26 generates a signal which is an electrical analog of the vertical component of the earth's magnetic field, $H_z$. The value to which generator 26 is set may be obtained from conventional navigational charts and tables, as previously noted. Generator 26 may be, if desired, a calibrated potentiometer connected to a suitable voltage source. The output of generator 26 is connected to a multiplier 27.

Multiplier 27, as its name suggests, produces an output signal which is the electrical analog of the product of $H_z$ from generator 26 and the output signal of a sine pitch generator 28. The signal generated by sine pitch generator 28 is the electrical analog of the sine of the angle pitch indicated as $p$ in FIG. 1 and is connected to multiplier 27 by suitable circuitry. The heart of sine pitch generator 28 is a pendulum operated control transformer to be described herein.

Multiplier 27 has its output connected to adder 29. Adder 29 is also effectively connected to amplifier 25 to receive the amplifier magnetometer output therefrom. An electrical signal is produced by adder 29 which is the electrical analog of the sum of the input signals from amplifier 25 and multiplier 27. The output of adder 29 is connected to divider 31.

Divider 31 is also effectively connected to cosine pitch generator 32 to receive signals therefrom. Cosine pitch generator produces a signal which is the electrical analog of the cosine of the angle of pitch, angle $p$ in FIG. 1. Cosine pitch generator 32 together with sine pitch generator 28 comprise a pitch sensor 33, as indicated by the broken line enclosure in FIG. 2. Pitch sensor 33, manual $H_z$ signal generator 26, multiplier 27, adder 29, and divider 31 cooperate in a fashion to be more specifically described to comprise a pitch compensation means.

The output of divider 31 is connected to the input of divider 34. Divider 34, which is essentially identical to divider 31, also has an input connected to manual $H_e$ signal generator 35. As indicated by the broken line enclosure, generators 26 and 35 may be conveniently combined into a chart input circuit 36, to be described herein. The output of divider 34 is connected to variable control transformer 37.

The output of control transformer 37 is applied to a servo-resolver 38. Servo-resolver 38 is a standard unit and provides an output of two alternating frequencies with a controlled phase difference therebetween for drive of a servo motor. The output from servo resolver 38 is connected to a heading readout 39 which contains a compass card driven by a servo motor in a known fashion.

Since magnetometer 24 is bidirectionally responsive, provision must be made to prevent heading readout 39 from indicating the rear azimuth rather than the heading angle. This function is provided by squaring and rooter circuit 41 which has its input connected to the output of divider 34 and its output connected via controlled gate circuit 42 to servo resolver 38.

Controlled gate circuit 42 produces an output when the signals fed thereto are positive, values of $\alpha$ between 0° and 180°, and no output when the input signals fed thereto are negative, values of $\alpha$ between 180° and 360°. Servo resolver 38 uses this signal in a conventional fashion to assure that the compass readout 39 does not indicate the rear azimuth of the heading angle $\alpha$.

Figure 3:
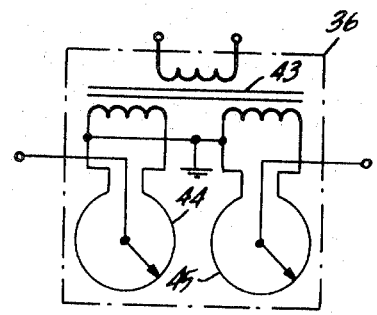
FIG. 3 is an illustration of the chart input circuit, a component part of the system of the invention.

Referring to FIG. 3, the chart input circuit is shown in a preferred embodiment as comprising a transformer 43 having two secondary windings. Potentiometers 44 and 45 are connected across the windings to serve as voltage dividers. With the primary winding connected to a suitable source of alternating current power, the output of potentiometers 44 and 45 will be calibrated to serve as generators 26 and 35. It should be noted that independent regulated power sources may be employed for generators 26 and 35, rather than the transformer circuit illustrated, if desired. However, the illustrated arrangement is particularly compact and inexpensive which is in keeping with the objects of invention.

Figure 4:
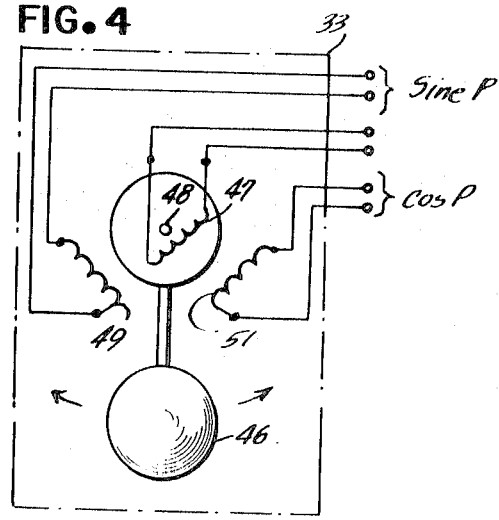
FIG. 4 is an illustration of the pitch sensor component of applicant's invention.

Pitch sensor 33, one of the input circuits in the aforedescribed system, is shown in FIG. 4. A pendulum 46 is influenced by gravity to remain vertical as ship 21 pitches about axis 23 (see FIG. 1). A winding 47 is caused to rotate about an axis 48 so as to move relative to two spaced windings 49 and 51. Windings 49 and 51 are mutually perpendicular.

As will be understood by those versed in the electrical arts, an electrical current will be induced in windings 49 and 51 in response to an alternating electrical current flowing in winding 47 and the angular movement of winding 47 about axis 48. These induced electrical currents will be related to one another as the sine and cosine of the angle of displacement of pendulum 46 which is, of course, the angle of pitch $p$. Winding 47 may be conveniently connected to the same source of alternating current as chart input circuit 36.

Figure 5:
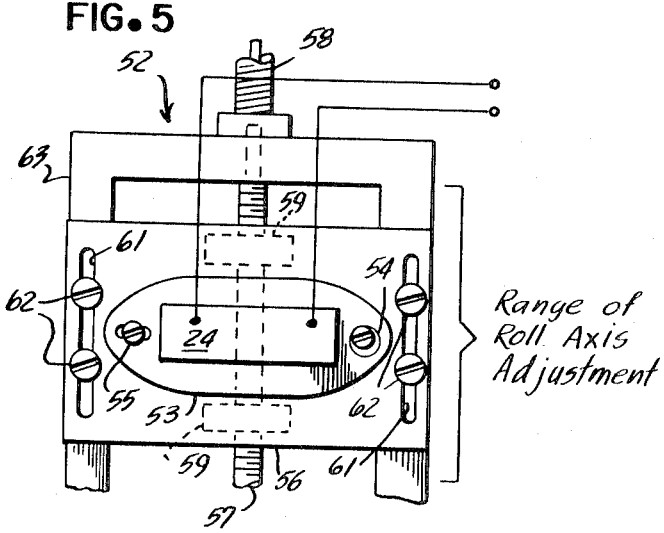
FIG. 5 shows a preferred mounting arrangement for a magnetometer as used in applicant's invention.

The support of magnetometer 24 is provided by suitable support means such as the magnetometer mounting assembly 52 shown at FIG. 5. Magnetometer 24 is mounted on a mounting plate 53. Eccentric adjusting screw 54 and a retaining screw 55 provide angular adjustment of mounting plate 53 with respect to vertical carriage 56. Threaded drive rod 57 is turned axially by a flexible shaft 58 and cooperates with threaded pillow blocks 59 to move vertical carriage 56 vertically. Vertical carriage 56 is constrained in its path of motion by slots 61 and retaining screws 62 which extend into frame members 63. Frame members 63 may be part of the structure of the vehicle, if desired, but more often are a component part of mounting arrangement 52 to be placed as a unit in a desired craft. In either case, frame members 63 are positioned in line and in a vertical plane in such a manner as to support magnetometer 24 in the vertical plane which contains the longitudinal axis of the vehicle and with the sensitivity axis thereof in a substantially horizontal attitude.

In lieu of flexible cable 58 a reversible drive motor, not shown, may be connected to drive rod 57. For purposes of cost reduction the flexible cable 58 together with a manual operator provide satisfactory drive. As described above, the arrangement of magnetometer mounting assembly 52 permits magnetometer 24 to be positioned to adjust the axis of magnetometer 24 both vertically and angularly.

FIGS. 6 through 9 illustrate the logic circuit portion of applicant's invention in a more complete but still diagrammatic form. Only the signal portion is shown, power supply and biasing arrangements have been omitted for purposes of simplicity. The circuits will be recognized as being known prior art configurations and are included to provide the skilled worker a more detailed teaching of the preferred embodiment. Circuits of this type are commerically available and other arrangements which perform the same logical functions may be substituted therefor, if desired. Of themselves, the circuits form no part of the present invention. Too, because the circuits of the figures are schematically shown, they will be discussed in a somewhat functional manner. The circuits substituted therefor may, of course, function somewhat differently.

Referring to FIG. 4, the magnetometer 24 has an output which is amplified by a suitable amplifier 25 to raise the power of the signal to a workable level. As previously noted the magnetometer output signal is represented by $$H_e \cos \alpha \cos p - H_z \sin p$$

This signal is fed to the adder circuit 29.

Figure 6:
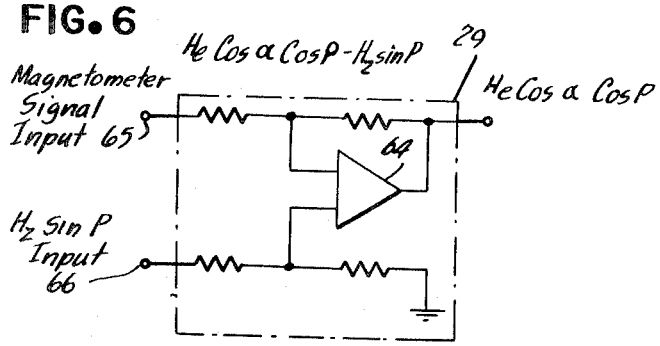
FIG. 6 illustrates a preferred form of an adder circuit used as a component of the invention.

FIG. 6 illustrates diagrammatically the adder 29. The circuit diagram indicates that adder 29 is a conventional adder circuit with an operational amplifier 64. Input terminal 65 is connected to the magnetometer input. Input terminal 66 is supplied a signal corresponding to $H_z \sin p$ which is derived from the chart input circuit 36 and the pitch sensor 33. At output terminal 67, the combined signal corresponding to $H_e \cos \alpha \cos p$ is obtained.

Figure 7:
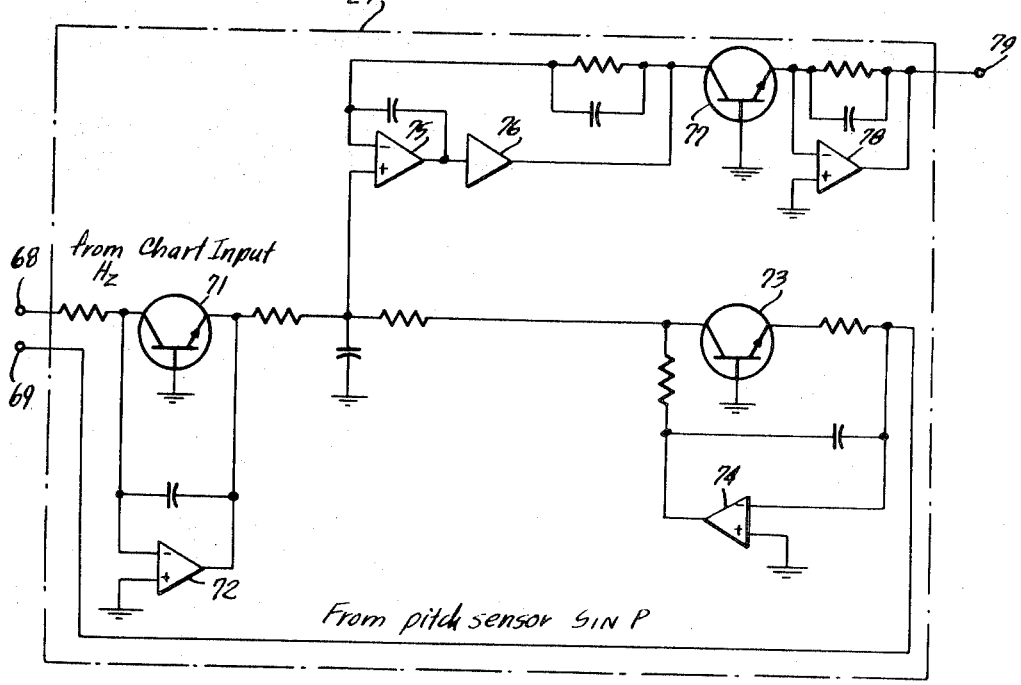
FIG. 7 illustrates an exemplary form of a multiplier circuit as preferred in the present invention.

Referring to FIG. 7, there is shown a diagrammatic representation of multiplier 27 which produces the $H_z \sin p$ signal fed to adder 29. Input terminals 68 and 69 are connected to the chart input circuit 36 and to the pitch sensor 33. Transistor 71 and amplifier 72 are connected to terminal 68 and comprise a logarithmic amplifier to provide a log of $H_z$ signal. Similarly transistor 73 and amplifier 74 are fed the sin $p$ signal from input terminal 69 and function to produce a log sin $p$ signal. The two log signals are combined and amplified by operational amplifier 75. The current of the output from amplifier 75 is increased to an operational level by the current amplifier 76. Transistor 77 and amplifier 78 are connected to take the antilog of this signal and supply the desired $H_z$ sin $p$ signal to output terminal 79, and, as previously noted, to adder 29.

In the above discussion, as well as in the circuit descriptions to follow, the principal functions of the components are described. Since the circuits are in themselves standard configurations, the skilled worker in the logic circuitry will readily understand the operation of the circuits. Should a more complete descriptive analysis be desired, attention is invited to any of the textbooks on the subject such as Computer Handbook, by H. D. Huskey and G. A. Korn, McGraw-Hill and Co., New York, Library of Congress Number 60–15286.

As previously described in connection with FIG. 2, the output of adder 29, the electrical analog of $H_e \cos p \cos \alpha$, is supplied to divider 31. The other signal supplied to divider 31 is the cos $p$ output from cosine pitch generator 32 component of pitch sensor 33.

Figure 8:
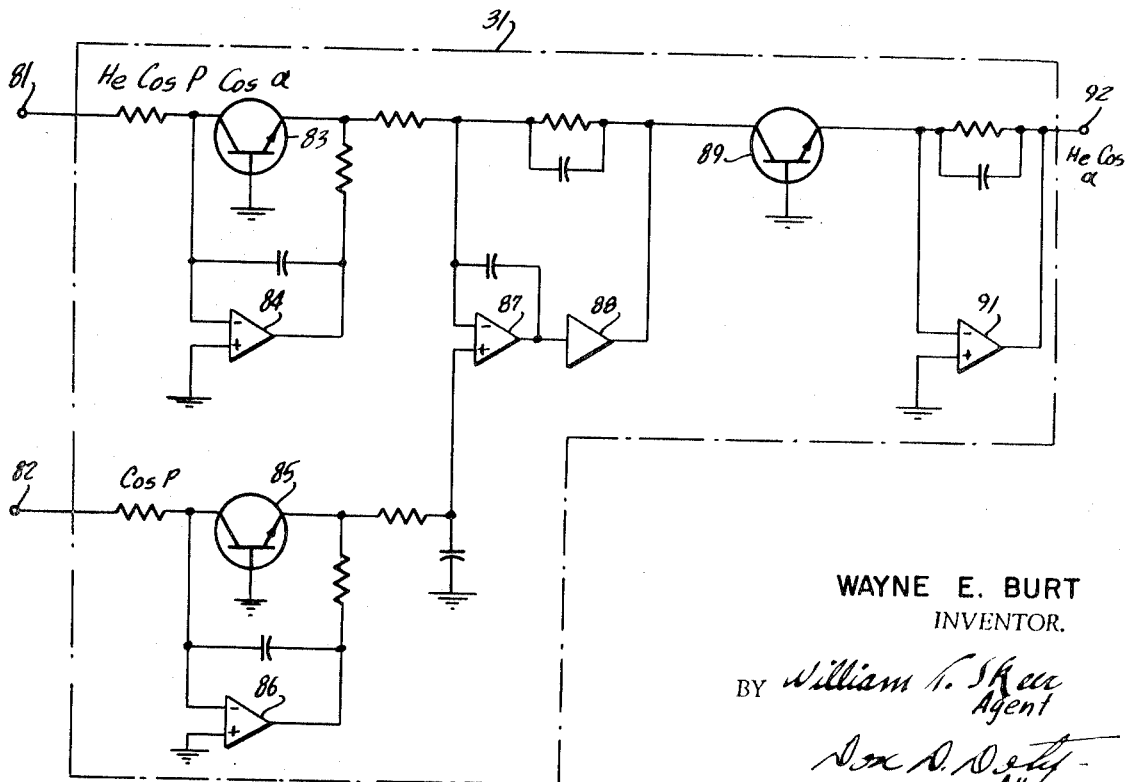
FIG. 8 illustrates a divider circuit used as a component in applicant's invention.

Referring to FIG. 8 there is shown a schematic representation of divider 31. Input terminals 81 and 82 are connected to adder 29 and pitch sensor, respectively. Transistor 83 and amplifier 84 are arranged as a logarithmic amplifier and connected to input terminal 81 to produce a signal which is the electrical analog of log $H_e \cos p \cos \alpha$. Transistor 85 and amplifier 86 are similarly connected in circuit with input terminal 82 to produce a signal which is the electrical analog of log cos $p$. These respective outputs are fed to an operational amplifier 87 where they are combined to produce the electrical analog of log $H_e \cos \alpha$. This signal is raised to the desired level by current amplifier 88 prior to being fed to transistor 89. Transistor 89 together with amplifier 91 are connected in circuit as an antilog amplifier and supply the electrical analog of $H_e \cos \alpha$ to output terminal 92 and therefrom to divider 34.

Divider 34 is identical to divider 31 except for the input connections. As shown in FIG. 2, divider 34 receives its input from divider 31 and $H_e$ generator 35 component of chart input circuit 36. Accordingly, its output signal is the electrical analog of cos $\alpha$. It should be apparent to one versed in the art that, since the circuits are identical, certain economies of components and gain in processing fidelity might be realized by combining dividers 31 and 35. This has not been done in development models because the individual circuits described and illustrated above are readily obtained as commercially available integrated circuit modules.

The output from divider 34 is fed to control transformer 37 and from there to servo resolver 38, as shown in FIG. 2. Both of these units are well known servo system components and perform only their normal functions in the compass system of the invention. Unfortunately, for the purposes of circuit simplicity, the cos $\alpha$ function is cyclic over 180° and additional circuitry is necessary to prevent the system from indicating the back azimuth rather than the correct heading of the vessel. This function is adequately performed by squaring and rooter circuit 41.

Figure 9:
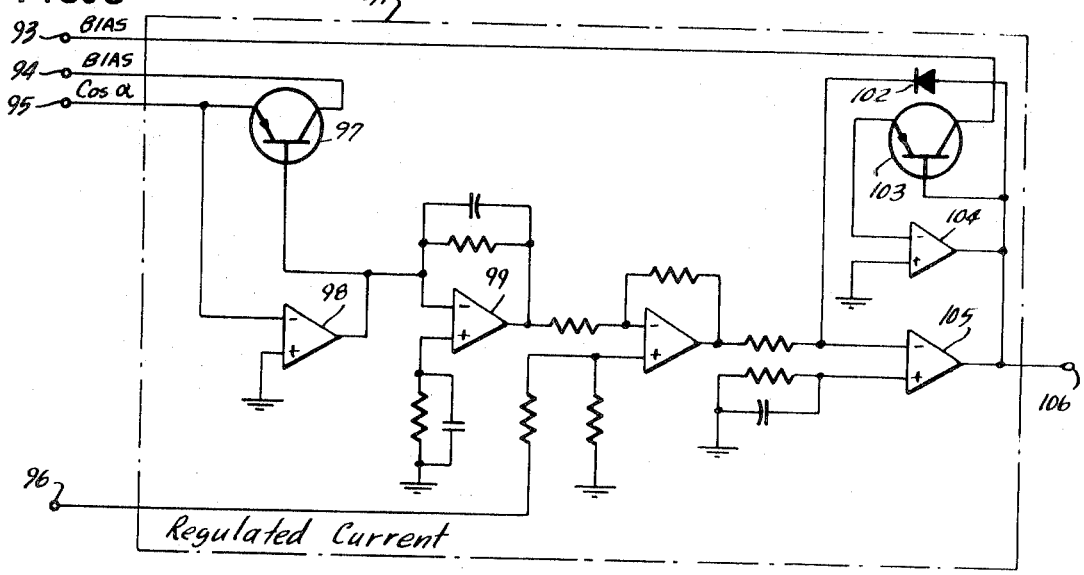
FIG. 9 is a schematic illustration of a squaring and rooter circuit used as a component of applicant's invention.

Referring to FIG. 9, input terminals 93 and 94 of squaring and rooter circuit 41 are connected to a regulated power source, not shown, to supply the biasing requirements for the circuit. Terminal 95 is connected to divider 34 to receive the cos $\alpha$ signal therefrom. Terminal 96 is connected to a regulated power source to supply a regulated current corresponding to unity in the calculations of the circuit. Transistor 97 and amplifiers 98 and 99 together comprise a squaring circuit and produce an electrical analog of $\cos^2 \alpha$ in response to the signal fed thereto from input terminal 95. This $\cos^2 \alpha$ signal is fed to amplifier 101 where it is subtracted from the regulated current signal to produce a signal corresponding to $1 - \cos^2 \alpha$. Diode 102, transistor 103, and amplifiers 104 and 105 are connected to amplifier 101 to operate on the output thereof to produce the electrical analog of $\sqrt{1-\cos^2 \alpha}$ which is applied to terminal 106. The output signal, $\sqrt{1-\cos^2 \alpha}$, is, of course, the equivalent of sin $\alpha$.

As shown in FIG. 2, the output from squaring and rooter circuit is supplied to a control gate 42. This circuit produces an output only when sin $\alpha$ is positive, that is when $\alpha$ is between 0° and 180°. This information is fed to servo resolver 38 where, as previously noted, it is utilized in conventional coincidence circuits contained therein to assure that servo readout 39 does not lock in on the reverse azimuth to the heading angle $\alpha$.

From the foregoing, it may be seen that applicant's invention provides an improved magnetic compass. The increased sensitivity of the magnetometer is used to gain an increase in sensitivity over the movable magnet type of compass. The inaccuracies generated by movement of the craft in which the compass is mounted are compensated by a novel circuit arrangement.

Figure 10:
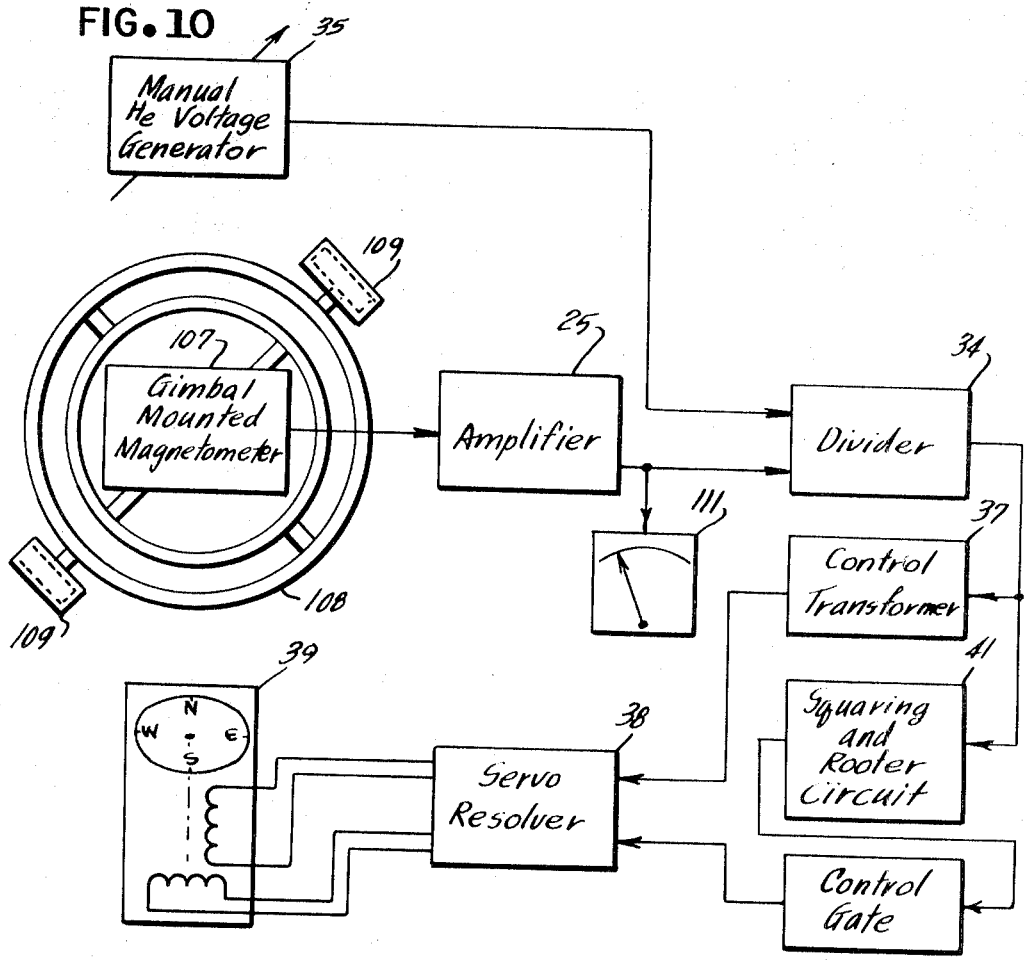
FIG. 10 illustrates an alternative arrangement for a compass system according to the invention.

FIG. 10 shows an alternative arrangement of the system of the invention where the electrical compensation for pitch is replaced by an all mechanical equivalent. As shown, magnetometer 107 is mounted on a gimbal mount 108 suspended from supports 109. Gimbal mount 108 moves under the influence of gravity as the ship pitches to keep magnetometer 107 horizontal. Supports 109 may, in turn, be affixed to vertical carriage 56 for vertical movement therewith. The other components of the system are the same as those of the system of FIG. 2 having identical numbers. Although the system of FIG. 10 has some of the mechanical features of a conventional mechanical type magnetic compass, the increased sensitivity of the magnetometer and the freedom of installation arrangements makes the system markedly better than the magnetic prior art counterpart.

It will be observed that a meter 111 is incorporated in the system of FIG. 2. Meter 111 is connected to indicate the amplified magnetometer output. Since magnetometer 107 is supported in a horizontal plane, meter 111 indicates a figure corresponding to the value of $H_L$, and may be conveniently calibrated in the same units as manual $H_e$ generator 35. In some areas where complete magnetic charts are unavailable, the compass system of FIG. 10 may be preferred to that of FIG. 2.

Meter 111 may also be installed in the compass system of FIG. 2, if desired. In such circumstances, meter 111 is connected between amplifier 25 and adder 29. Of course, to be used in the same fashion in the system of FIG. 2, it is necessary to trim the magnetometer 24 to a horizontal position. This trimming may be accomplished with either the eccentric screw 54 (FIG. 5) or with the throttle of the vessel in which the compass system is mounted. The economies of mass purchasing and the simplicity afforded by using a single style binnacle for both systems has made the use of meter 111 in both systems desirable.

Meter 111 has the added function as serving as an indicator of unusually strong magnetic bodies in the vicinity of the craft. In such capacity it serves as a simplified metal detector useful in salvage operations, for example.

The foregoing description is sufficient to enable one skilled in the arts to construct the device of the invention. However, to further explain the device and its contemplated manner of use, the following mode of operation is included.

MODE OF OPERATION

Before a discussion of the preferred mode of operation of the component units comprising the instant invention is undertaken, a review of the functional operation of the circuits of FIGS. 2 and 10 is desirable.

Referring to FIG. 2, the output of the magnetometer 24, a signal corresponding to $H_e \cos \alpha \cos p - H_z \sin p$, is amplified by amplifier 25 and fed to adder 29. The product of the output signals of $H_z$ generator 26 and sine pitch generator 28, produced by multiplier 27, is also fed to adder 29 to produce a sum signal corresponding to $H_e \cos \alpha \cos p$. The sum signal output of adder 29 is fed to divider 31 along with the output from the cosine pitch generator 32 to produce a first quotient signal, $H_e \cos \alpha$. The first quotient signal is further divided, in divider 34, by the output signal from the manual $H_e$ generator 35 to produce a second quotient signal corresponding to $\cos \alpha$. This second quotient signal is fed to servo resolver 38 via control transformer 37 to drive servo type heading readout 39. Divider 34 also feeds the second quotient signal to squaring and rooter circuit 41 to produce an output signal corresponding to $\sin \alpha$ therefrom. This signal is used to determine the output from control gate 42 which is fed to servo resolver 38 to prevent heading readout from indicating the reverse azimuth rather than the desired heading angle $\alpha$.

Tht system of FIG. 10 has a magnetometer output corresponding to $H_e \cos \alpha$ ($=H_L$) from magnetometer 107 which is amplified by amplifier 25. Meter 111 is connected so as to measure this value. The function of the other component circuits is the same as in the circuit of FIG. 2, as previously noted.

Figure 12:
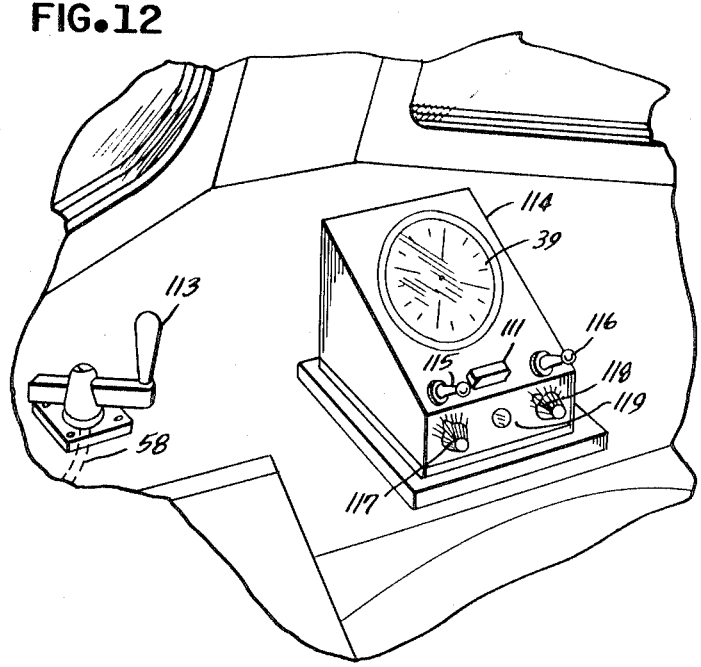
FIG. 12 illustrates the operational controls of the watercraft of FIG. 11 with particular attention to the device of the invention.
Figure 11:
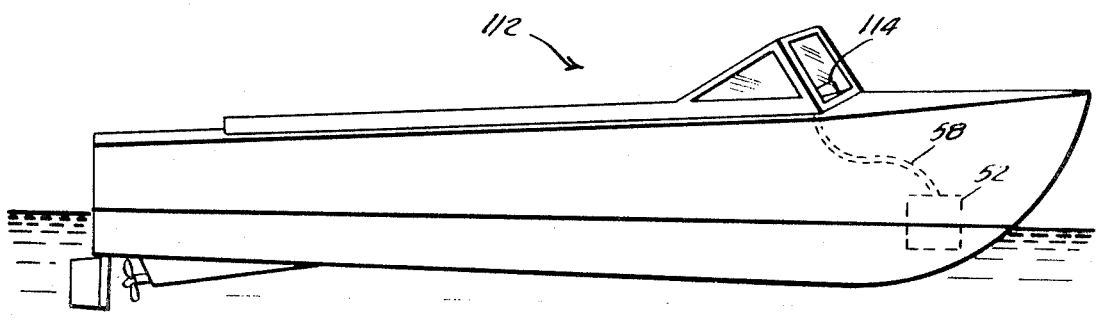
FIG. 11 shows how applicant's apparatus may be arranged in a small surface watercraft.

Referring to FIG. 11, magnetometer mounting assembly 52 is placed in the forward portion of the hull of a surface vessel 112 and along the longitudinal axis thereof. In this location the effect of any magnetic material in the passenger cockpit is minimized. Flexible shaft 58 together with the leads to magnetometer 24 are routed to the area of pilot operations where, as shown in FIG. 12, flexible shaft 58 is terminated in an operating handle 113. Adjustment of handle 113 moves the magnetometer 24 vertically to place the axis thereof on the roll axis of vessel 112. Eccentric screw 54 is adjusted to place the axis of magnetometer 24 at the angle corresponding to the trim angle of the boat when underway. This angle is a design parameter of vessel 112 and need not be adjusted once installation is complete.

Referring to FIG. 12, the complete remainder of the device is shown housed in an appropriate pyx, such as binnacle 114. Two toggle switches 115 and 116, not previously discussed, control, respectively, the power on-off function and an illumination source for night use. Knob 117 controls manual $H_z$ generator 26 and knob 118 controls manual $H_e$ generator. A hole 119 in binnacle 114 permits screwdriver adjustment of control transformer 37. Control transformer 37 may be adjusted to compensate for small errors in alignment of magnetometer mounting assembly 52 with the longitudinal axis of vessel 112. Control transformer 37 may also be adjusted to have readout 39 indicate true headings rather than magnetic headings.

Upon installation the compass is energized by switch 115 and the values of $H_z$ and $H_e$ set on knobs 115 and 116, respectively. The ship is then held on a known course and control transformer 37 adjusted through hole 119 until the desired heading, either magnetic or true, appears on readout 39. While shifting cargo or personnel from side-to-side, handle 113 is adjusted to minimize heading deviations. This completes the initial adjustments and the device may then be used as an ordinary magnetic compass.

Should the system of FIG. 10 be employed, knob 115 may be omitted or used to control the intensity of night illumination.

In the system of FIG. 10, where the magnetometer is in the horizontal plane, the operation of the compass system is facilitated by meter 111 being calibrated in the same units as knob 118. Vessel 112 is then slowly brought about to box the compass and the maximum reading on meter 111 is used as a setting for knob 118, thereby obviating the need for a chart.

When this technique is used with the system of FIG. 2, a small error results from not knowing the correct value of $H_z$ to set for knob 117. This error may be minimized by setting knob 117 to an approximate value and making secondary corrections therewith, so as to make readout 39 indicate a known heading to which the vessel 112 is held.

The foregoing description taken together with the appended claims constitute a disclosure such as to enable a person versed in the electronic navigation arts and having the benefit of the teaching contained therein to make and use the invention. Further, the structure herein described meets the objects of invention, and generally constitutes a meritorious advance in the art unobvious to such a worker not having the benefit of the teachings contained herein.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A magnetic compass system for indicating the relative heading of a craft with respect to an ambient magnetic field comprising in combination:

sensor means having its sensing axis normally extending substantially horizontally and said axis being in fixed parallel relationship to a vertical plane containing the longitudinal axis of said craft and responsive to said magnetic field for producing an electrical signal corresponding to the relationship of said ambient magnetic field and said axis of said sensor means;

support means effectively connected to said craft and having a vertically movable portion effectively connected to said sensor means for vertical movement thereof;

pitch compensation means effectively connected to said sensor means for obviating the effect of pitch on said electrical signal produced by said sensor means;

first circuit means for generating an electrical signal and comprising control means manually movable for controlling said signal by positioning said control means in correspondence with at least one known parameter of said ambient magnetic field;

second circuit means effectively connected to said sensor means and to said first circuit means to receive the respective electrical signals therefrom for producing an electrical signal having a value trigonometrically related to said heading with respect to said ambient magnetic field;

third circuit means effectively connected to said second circuit means to receive said trigonometrically related signal therefrom for generating an electrical signal having a value related to the heading with respect to said ambient magnetic field by a trigonometric function different from said signal produced by said second circuit means; and readout means effectively connected to said second and third circuit means for producing a visual indication of said craft heading with respect to said ambient magnetic field.

2. A magnetic compass means according to claim 1 in which said first circuit means further comprises:

transformer means with a primary inductive winding for connection to a source of alternating current electrical power and at least one secondary winding in cooperative relation to said primary winding; and variable resistance means connected across said secondary winding for providing a variable voltage output in dependence upon predetermined settings thereof.

3. A magnetic compass system according to claim 1 wherein said second circuit means comprises a logic circuit effectively dividing one of two input signals by the other input signal for producing an output signal which is the electrical analog of the cosine function of the heading angle of said craft.

4. A magnetic compass system according to claim 1 wherein said third circuit means comprises a logic circuit which squares the input signal supplied thereto, subtracts said squared signal from a reference signal, and extracts a root thereof for producing an output signal which is the electrical analog of the sine function of the heading angle of said craft.

5. A magnetic compass system according to claim 1 wherein said sensor means comprises a magnetometer.

6. A magnetic compass system according to claim 5 wherein said sensor means further comprises an amplifier effectively connected to said magnetometer for increasing the electrical power of the electrical signal therefrom to a predetermined level.

7. A magnetic compass system according to claim 1 wherein said pitch compensation means includes a gravity influenced mechanical movement which moves in response to the pitch of said craft.

8. A magnetic compass system according to claim 7 wherein said mechanical movement is effectively connected to a movable winding of a transformer generator.

9. A magnetic compass system according to claim 7 wherein said mechanical movement is connected to the aforesaid sensor means and to the aforesaid support means to keep said sensor means in a horizontal plane as said craft pitches.

10. A magnetic compass system for indicating the relative heading of a surface vessel with respect to the earth's magnetic field comprising in combination:

magnetometer means for producing an electrical signal in response to the angle between the axis thereof and the earth's magnetic field;

support means having a fixed portion thereof attached to said surface vessel and a vertically movable carriage portion attached to said magnetometer means for support thereof;

flexible shaft means connected to said support means for movement of said vertically movable carriage portion in response to rotation of said flexible shaft means;

operating handle means mounted for rotation on said surface vessel at a point convenient to the pilot thereof and effectively attached to said flexible shaft means for rotation thereof in response to manual rotation of said operating handle;

amplifier means effectively connected to said magnetometer means for increasing the magnitude of the electrical signal output thereof to a predetermined level;

chart input circuit means for generating a vertical output signal having a predetermined relationship to the vertical component of the earth's magnetic field in response to the manual positioning of a control thereof and for generating a horizontal output signal having a predetermined relationship to the horizontal component of the earth's magnetic field in response to the manual positioning of a control thereof;

pitch sensor means including a gravity responsive pendulum which moves a winding of a transformer to generate two output signals having a predetermined trigonometric relationship to the angle of pitch of said surface vessel;

multiplier circuit means effectively connected to receive one of the output signals from said pitch sensor means and effectively connected to said chart input circuit means to receive the vertical output signal therefrom for generating an output signal which is the product of the two signals received thereby;

adder circuit means effectively connected to said amplifier means for receipt of said amplifier magnetometer signal therefrom and also effectively connected to said multiplier circuit to receive the product output signal therefrom for producing an output signal which is the sum of two signals received thereby;

first divider circuit means effectively connected to said adder circuit for receipt of said sum output signal therefrom and effectively connected to said pitch sensor means for receipt of said other of said output signals therefrom for producing an output signal which is the quotient obtained by dividing the output of said adder circuit means by the output of said pitch sensor means received thereby;

second divider circuit means effectively connected to said chart input circuit means for receipt of said horizontal output signal therefrom and effectively connected to said first divider circuit means for receipt of said quotient output signal therefrom for producing an output signal which is the quotient obtained by dividing the quotient output signal from said first divider circuit means by the horizontal output signal from said chart input circuit means;

control transformer means effectively connected to said second divider circuit means to receive of said quotient output signal therefrom for producing an output signal which is displaced in phase from the quotient signal received thereby;

squaring and rooter circuit means effectively connected to said second divider circuit means to receive the quotient signal therefrom for sequentially squaring said signal, subtracting the resultant signal from a standard signal, and extracting the square root of the difference obtained thereby to produce a root output signal which bears a trigonometric relation to the input quotient signal received thereby;

controlled gate circuit means effectively connected to said squaring and rooter circuit means to receive the output signal therefrom for producing an output signal when said root output signal is positive;

servo resolver circuit means effectively connected to said control transformer means and to said controlled gate circuit to receive the respective output signals therefrom for producing an output signal therefrom which is phase related to a power frequency supplied thereby in accordance to the heading angle of said surface vessel with respect to the earth's magnetic field; and readout means effectively connected to said servo resolver means and including a servo motor driven thereby for providing a visual indication of the heading of said surface vessel.

References Cited

UNITED STATES PATENTS

| | | | |
|---|---|---|---|
| 2,443,595 | 6/1948 | Braddon | 33—225 A |
| 2,581,428 | 1/1952 | McCarthy | 33—224 |
| 2,597,125 | 5/1952 | Noxon | 33—224 |
| 2,706,801 | 4/1955 | Tolles | 33—224 X |
| 2,852,859 | 9/1958 | Depp | 33—204 FA X |
| 3,516,173 | 6/1970 | Koerner | 33—222 |

ROBERT B. HULL, Primary Examiner

U.S. Cl. X.R.

33—225 A